United States Patent
Ye (10) Patent No.: US 11,587,354 B2
(45) Date of Patent: Feb. 21, 2023

(54) PHOTOELECTRIC FINGERPRINT IDENTIFICATION APPARATUS, TERMINAL, AND FINGERPRINT IDENTIFICATION METHOD

(71) Applicant: VIVO MOBILE COMMUNICATION CO., LTD., Guangdong (CN)

(72) Inventor: Jinshan Ye, Guangdong (CN)

(73) Assignee: Vivo Mobile Communication Co., Ltd., Guangdong (CN)

( * ) Notice: Subject to any disclaimer, the term of this patent is extended or adjusted under 35 U.S.C. 154(b) by 0 days.

(21) Appl. No.: 17/412,500

(22) Filed: Aug. 26, 2021

(65) Prior Publication Data
US 2021/0383089 A1   Dec. 9, 2021

Related U.S. Application Data (63) Continuation of application No. PCT/CN2020/076146, filed on Feb. 21, 2020.

(30) Foreign Application Priority Data

Feb. 28, 2019   (CN) .......................... 201910153163.6

(51) Int. Cl.
    *G06V 40/12*   (2022.01)
    *G06V 10/143*  (2022.01)
    *G06V 40/13*   (2022.01)

(52) U.S. Cl.
    CPC ........ *G06V 40/1394* (2022.01); *G06V 10/143* (2022.01); *G06V 40/1318* (2022.01)

(58) Field of Classification Search
    CPC ............ G06V 40/1394; G06V 10/143; G06V 40/1318; G06V 10/47; G06V 40/45
    See application file for complete search history.

(56) References Cited

U.S. PATENT DOCUMENTS

| | | | |
|---|---|---|---|
| 9,842,245 | B1 | 12/2017 | Setterberg et al. |
| 2002/0076089 | A1 | 6/2002 | Muramatsu et al. |
| 2007/0253607 | A1 | 11/2007 | Higuchi |
| 2008/0037001 | A1* | 2/2008 | Yokoyama .............. G06V 40/67 356/388 |
| 2017/0004352 | A1 | 1/2017 | Jonsson et al. |

(Continued)

FOREIGN PATENT DOCUMENTS

| | | |
|---|---|---|
| CN | 101957914 A | 1/2011 |
| CN | 105117697 A | 12/2015 |

(Continued)

*Primary Examiner* — Abhishek Sarma
(74) *Attorney, Agent, or Firm* — Price Heneveld LLP (57) ABSTRACT

A photoelectric fingerprint identification apparatus, a terminal, and a fingerprint identification method are provided. The apparatus includes: a light-emitting unit, where the light-emitting unit generates at least a first light signal and a second light signal; a photoelectric fingerprint sensor, where the photosensitive fingerprint sensor includes a first sensing region and a second sensing region that do not overlap each other, and the first sensing region is covered with an infrared filter; an image detection unit, configured to detect reflected light energy of the first sensing region to obtain fingerprint information; and a living body detection unit, configured to detect reflected light energy of the second sensing region to obtain living body detection information.

20 Claims, 5 Drawing Sheets

(56) References Cited

U.S. PATENT DOCUMENTS

2017/0220838 A1* 8/2017 He .................... G06F 3/042
2017/0337413 A1* 11/2017 Bhat ............. G06V 40/1318

FOREIGN PATENT DOCUMENTS

| CN | 205281522 A | 6/2016 |
| CN | 205302331 U | 6/2016 |
| CN | 105796114 A | 7/2016 |
| CN | 106663204 A | 5/2017 |
| CN | 207051920 U | 2/2018 |
| CN | 107784274 A | 3/2018 |
| CN | 108664854 A | 10/2018 |
| CN | 109255285 A | 1/2019 |
| CN | 109934137 A | 6/2019 |
| WO | 2017214582 A1 | 12/2017 |

* cited by examiner

First sensing area
 Second sensing area

FIG. 5

First sensing area
 Second sensing area

PHOTOELECTRIC FINGERPRINT IDENTIFICATION APPARATUS, TERMINAL, AND FINGERPRINT IDENTIFICATION METHOD

CROSS-REFERENCE TO RELATED APPLICATIONS

This application is a continuation application of International Application No. PCT/CN2020/076146 filed on Feb. 21, 2020, which claims priority to Chinese Patent Application No. 201910153163.6 filed in China on Feb. 28, 2019, both disclosures of which are incorporated herein by reference in their entireties.

TECHNICAL FIELD

The present disclosure relates to the field of communications technologies, and in particular, to a photoelectric fingerprint identification apparatus, a terminal, and a fingerprint identification method.

BACKGROUND

In the related art, to guard the information security of users, use of a fingerprint identification function becomes increasingly common on terminal devices. For example, the fingerprint identification function is used to unlock a mobile phone or make a mobile payment (such as a WeChat payment or transfer), which is convenient and fast.

The rationale of photoelectric fingerprint identification or detection is mainly to obtain a fingerprint image by using a fingerprint sensor to sense, receive and process light signals emitted by a light source that are reflected by the pattern of lines of a finger, where ridges and valleys in the pattern of lines cause different reflections. Depending on different product forms, different light sources are designed. For example, an emission light source for fingerprint identification on an organic light-emitting diode (OLED) photoelectric screen may be self-luminance of screen pixels.

During photoelectric fingerprint identification, strong light, for example, sunlight, or red light and unwanted infrared transmitted through the finger will also be received and imaged by the sensor, causing interference to imaging of normally reflected light. Therefore, an infrared filter with a cutoff frequency of about 600 nm is designed above the sensor, and mainly used to filter out red light and infrared.

Based on the foregoing photoelectric fingerprint design, if a fake fingerprint photo or a silicone head having the same brightness difference as an input object is used, a ridge-valley energy difference can also be reflected, and consequently, a similar fingerprint image may also be formed on the sensor and recognized by mistake. Therefore, a related anti-counterfeit design is quite necessary. A common anti-counterfeit method in the related art is to use visible light for living body detection. A visible light source mainly uses red light and infrared because such light penetrates human skins at a high rate. A basic principle is to emit, for example, infrared to penetrate a finger, where due to a difference in blood flow during beating, contraction, and dilation of internal blood vessels, reflected infrared energy is different. The reflected difference is received and processed by an infrared sensor, so that human heart rate detection is implemented to obtain a living body feature and determine that it is not an abnormal object such as a photo or a silica gel.

However, different sensors need to be disposed for the foregoing photoelectric fingerprint design and living body detection that is based on visible light, and therefore costs thereof are relatively high, and a relatively large space is occupied. If the fingerprint sensor is directly used for infrared-based living body detection, since infrared is filtered out by the infrared filter designed above the fingerprint sensor, technical contradictions are present in design requirements.

SUMMARY

The present disclosure is implemented as follows: A photoelectric fingerprint identification apparatus includes:

a light-emitting unit, where the light-emitting unit generates at least a first light signal and a second light signal, the first light signal includes visible light that has a shorter wavelength than red light, and the second light signal includes red light or infrared;

a photosensitive fingerprint sensor, where the photosensitive fingerprint sensor includes a first sensing region and a second sensing region that do not overlap each other, and the first sensing region is covered with an infrared filter, where reflected light of the first light signal generated by the light-emitting unit is able to reach the first sensing region, and reflected light of the second light signal generated by the light-emitting unit is able to reach the second sensing region;

an image detection unit, where the image detection unit is connected to the photosensitive fingerprint sensor, and the image detection unit is configured to detect reflected light energy of the first sensing region to obtain fingerprint information; and a living body detection unit, where the living body detection unit is connected to the photosensitive fingerprint sensor, and the living body detection unit is configured to detect reflected light energy of the second sensing region to obtain living body detection information.

An embodiment of the present disclosure further provides a terminal, including the foregoing photoelectric fingerprint identification apparatus.

An embodiment of the present disclosure provides a fingerprint identification method, applied to the foregoing photoelectric fingerprint identification apparatus, or applied to the foregoing terminal. The method includes:

receiving a first input of an operating body pressing the photoelectric fingerprint identification apparatus, and starting the light-emitting unit in response to the first input;

detecting, by the living body detection unit, reflected light energy of the second sensing region to obtain living body detection information;

in a case in which the living body detection unit detects that the operating body is a living body, detecting, by the image detection unit, reflected light energy of the first sensing region to obtain fingerprint information; and identifying, by the terminal, the fingerprint information, and outputting a fingerprint identification result; where the light-emitting unit generates at least a first light signal and a second light signal, the first light signal includes visible light that has a shorter wavelength than red light, and the second light signal includes red light or infrared; and reflected light of the first light signal generated by the light-emitting unit is able to reach the first sensing region of the photosensitive fingerprint sensor, and reflected light of the second light signal generated by the light-emitting unit is able to reach the second sensing region of the photosensitive fingerprint sensor.

An embodiment of the present disclosure further provides a terminal, including a processor, a memory, and a computer program stored in the memory and capable of running on the processor, where when the computer program is executed by the processor, the steps of the foregoing fingerprint identification method are implemented.

An embodiment of the present disclosure further provides a computer-readable storage medium, where the computer-readable storage medium stores a computer program, and when the computer program is executed by a processor, the steps of the foregoing fingerprint identification method are implemented.

DESCRIPTION OF EMBODIMENTS

The following clearly describes the technical solutions in the embodiments of the present disclosure with reference to the accompanying drawings in the embodiments of the present disclosure. Apparently, the described embodiments are merely a part rather than all of the embodiments of the present disclosure. All other embodiments that a person of ordinary skill in the art obtained based on the embodiments of the present disclosure shall fall within the protection scope of the present disclosure.

In the embodiments of the present disclosure, terms such as "an example" or "for example" are used to represent an example, an instance, or an illustration. Any embodiment or design solution described as "an example" or "for example" in the embodiments of the present disclosure shall not be interpreted to be more preferential or advantageous than other embodiments or design solutions. Specifically, the terms such as "an example" or "for example" are intended to present related concepts in a specific manner.

The terminal provided by the embodiments of the present disclosure may be a mobile phone, a tablet computer, a notebook computer, an ultra-mobile personal computer (UMPC), a netbook, a wearable device, an in-vehicle device, a personal digital assistant (PDA), or the like. It should be noted that a specific type of the terminal is not limited in the embodiments of the present disclosure.

Figure 1:
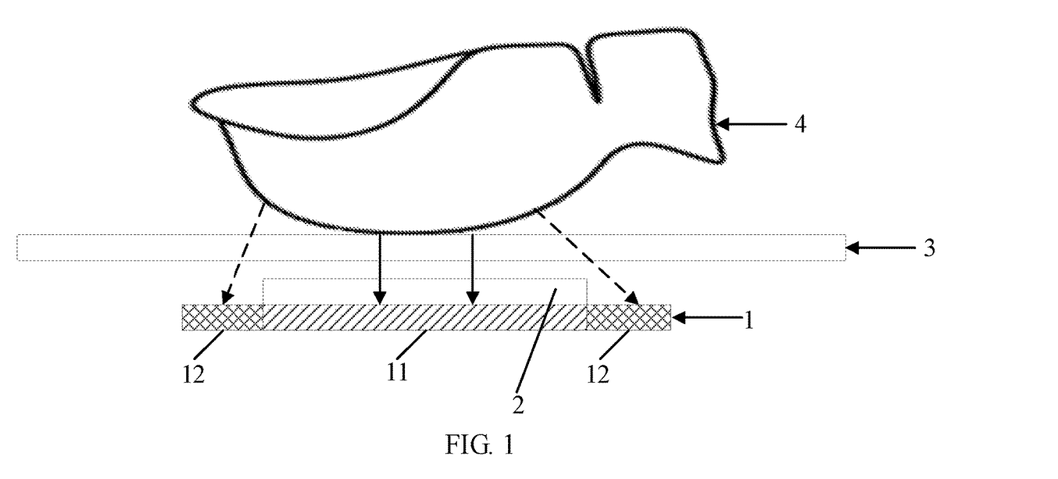
FIG. 1 presents a first schematic structural diagram of a photoelectric fingerprint identification apparatus according to an embodiment of the present disclosure.

As shown in FIG. 1, an embodiment of the present disclosure provides a photoelectric fingerprint identification apparatus, including:

a light-emitting unit, where the light-emitting unit generates at least a first light signal and a second light signal, the first light signal includes visible light that has a shorter wavelength than red light, and the second light signal includes red light or infrared;

a photosensitive fingerprint sensor 1, where the photosensitive fingerprint sensor 1 includes a first sensing region 11 and a second sensing region 12 that do not overlap each other, the first sensing region 11 is covered with an infrared filter 2, and the infrared filter 2 is mainly configured to filter out red light and infrared that interfere with fingerprint image capture, where reflected light of the first light signal generated by the light-emitting unit is able to reach the first sensing region, and reflected light of the second light signal generated by the light-emitting unit is able to reach the second sensing region;

an image detection unit, where the image detection unit is connected to the photosensitive fingerprint sensor, and the image detection unit is configured to detect reflected light energy of the first sensing region to obtain fingerprint information; and a living body detection unit, where the living body detection unit is connected to the photosensitive fingerprint sensor, and the living body detection unit is configured to detect reflected light energy of the second sensing region to obtain living body detection information.

It should be noted that in this embodiment of the present disclosure, the image detection unit and the living body detection unit may be one physical device in a specific application, such as a controller or a single-chip microcomputer, or may be two physical devices that are disposed separately. This is not specifically limited herein. In addition, locations of the image detection unit and the living body detection unit are not specifically limited in this embodiment of the present disclosure. All locations that can enable information interaction with the photosensitive fingerprint sensor 1 in a wired or wireless manner are applicable to this embodiment of the present disclosure.

In this embodiment of the present disclosure, the reflected light of the first light signal generated by the light-emitting unit is able to reach the first sensing region, and the reflected light of the second light signal generated by the light-emitting unit is able to reach the second sensing region. Therefore, the two functions of fingerprint identification and living body detection can be implemented by using one photosensitive fingerprint sensor, and costs and space for structural design are reduced.

Further, as shown in FIG. 1, the apparatus further includes a touch assembly 3, where the touch assembly 3 is provided with a detection surface capable of transmitting light signals.

The light-emitting unit emits the first light signal and the second light signal toward the detection surface, the first light signal reaches the first sensing region after being reflected by an obstruction 4 of the detection surface, and the second light signal reaches the second sensing region after being reflected by the obstruction 4 of the detection surface. For example, the obstruction is a finger. For another example, the touch assembly 3 is a light-emitting diode (LED) screen or an OLED screen.

In this embodiment of the present disclosure, a location of the light-emitting unit is not specifically limited, but the first light signal generated by the light-emitting unit is able to reach the first sensing region after being reflected by the obstruction on the detection surface, and the second light signal generated by the light-emitting unit reaches the second sensing region after being reflected by the obstruction on the detection surface.

In this embodiment of the present disclosure, the detection surface of the touch assembly 3 is a surface for fingerprint detection and living body detection. When an operating body (or referred to as an obstruction, such as a user's finger) presses or touches the detection surface, the first light signal and the second light signal reach the detection surface first, and then respectively reach the first sensing region and the second sensing region of the photosensitive fingerprint sensor after being reflected by the obstruction. In this case, the two functions of fingerprint identification and living body detection can be implemented, and the costs and space for structural design are reduced.

Figure 2:
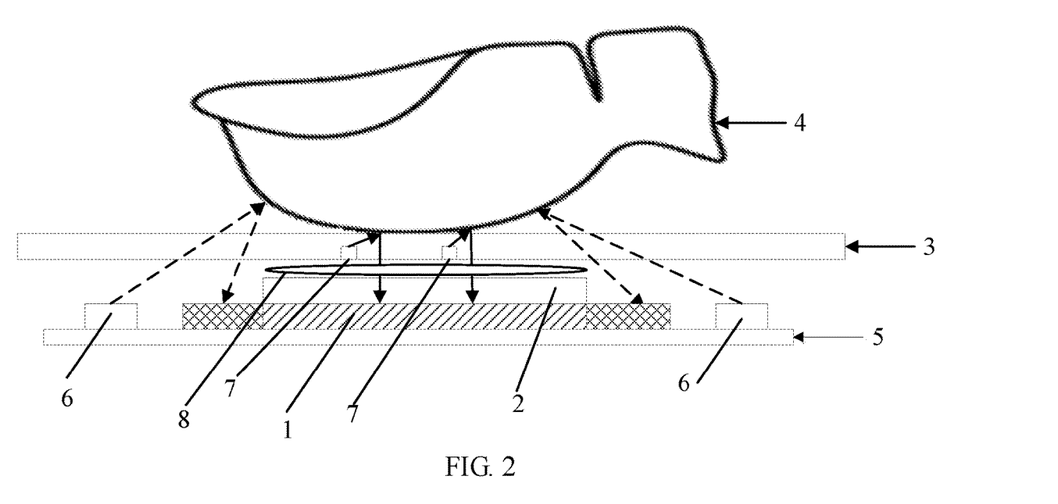
FIG. 2 presents a second schematic structural diagram of a photoelectric fingerprint identification apparatus according to an embodiment of the present disclosure.
Figure 3:
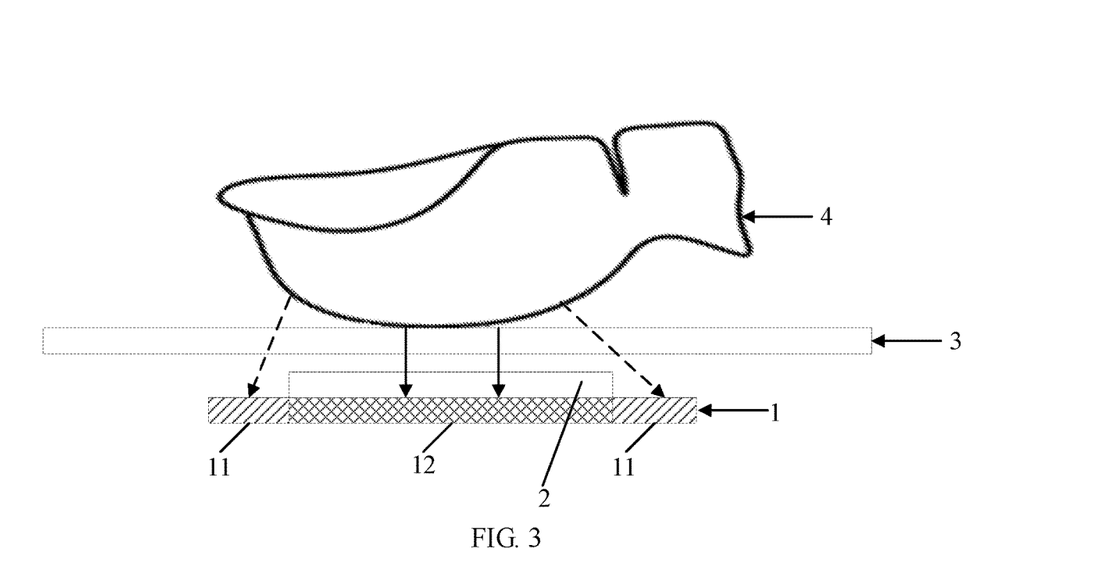
FIG. 3 presents a third schematic structural diagram of a photoelectric fingerprint identification apparatus according to an embodiment of the present disclosure.

Further, as shown in FIG. 2, the photoelectric fingerprint identification apparatus further includes:

a printed circuit board 5, where the photosensitive fingerprint sensor 1 is disposed on the printed circuit board 5.

Optionally, in an optional embodiment, the light-emitting unit includes:

a first light-emitting subunit 7, configured to generate the first light signal; and a second light-emitting subunit 6, configured to generate the second light signal, where the first light-emitting subunit 7 and the second light-emitting subunit 6 are both disposed on the printed circuit board 5 (not shown in the figure); or as shown in FIG. 2, the first light-emitting subunit 7 is disposed in the touch assembly 3, and the second light-emitting subunit 6 is disposed on the printed circuit board 5.

Optionally, a distance between the photosensitive fingerprint sensor 1 and the second light-emitting subunit 6 is less than a preset value. As shown in FIG. 2, two second light-emitting subunits 6 are arranged on both sides of the photosensitive fingerprint sensor 1. The second light-emitting subunits and the photosensitive fingerprint sensor 1 are arranged on the printed circuit board PCB together, and the second light-emitting subunits are disposed close to the photosensitive fingerprint sensor 1 to form a new circuit design.

It should be noted that the first light-emitting subunit 7 is mainly used as an emission light source for fingerprint image capture. The first light signal may be red/green/blue monochromatic light or composite light, used as a light source for the photosensitive fingerprint sensor to receive a reflected fingerprint ridge-valley energy difference. The second light-emitting subunit 6 is mainly used as an emission light source for living body detection.

Optionally, in this embodiment of the present disclosure, the sensing region of the photoelectric fingerprint sensor 1 includes a pixel array, for example, 200×200, where a size of each pixel is, for example, 50 μm or 5 μm, and the pixel size is determined based on a specific performance scheme.

The first sensing region 11 is an image capture pixel region for capturing a fingerprint image, and the second sensing region 12 is a virtual sensing pixel region for infrared sensing reception.

Optionally, as shown in FIG. 1, the virtual sensing pixel region is distributed on an outer side of the image capture pixel region. In this case, the infrared filter 3 covers a middle region of the photoelectric fingerprint sensor 1, and a shape of the infrared filter may be rectangular, square, circular, or the like, and is not specifically limited herein.

Alternatively, as shown in FIG. 2, the virtual sensing pixel region is distributed on an inner side of the image capture pixel region. In this case, the infrared filter 3 covers a circumferential region of the photoelectric fingerprint sensor 1, and a shape of the infrared filter may be a hollowed ring structure, for example, a circular ring structure or a square ring structure, and is not specifically limited herein.

Figure 4:
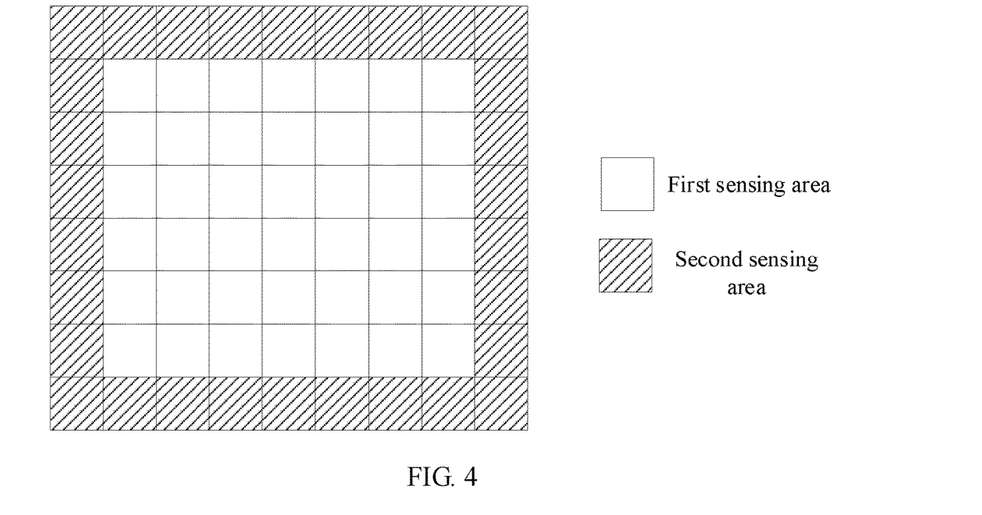
FIG. 4 presents a first schematic diagram of locations of a first sensing region and a second sensing region of a photosensitive fingerprint sensor in a photoelectric fingerprint identification apparatus according to an embodiment of the present disclosure.
Figure 5:
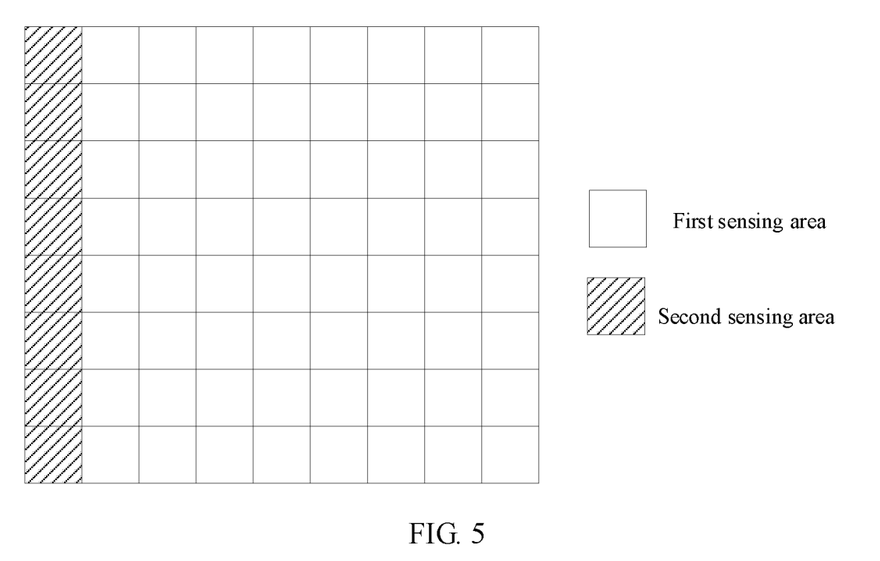
FIG. 5 presents a second schematic diagram of locations of a first sensing region and a second sensing region of a photosensitive fingerprint sensor in a photoelectric fingerprint identification apparatus according to an embodiment of the present disclosure.
Figure 6:
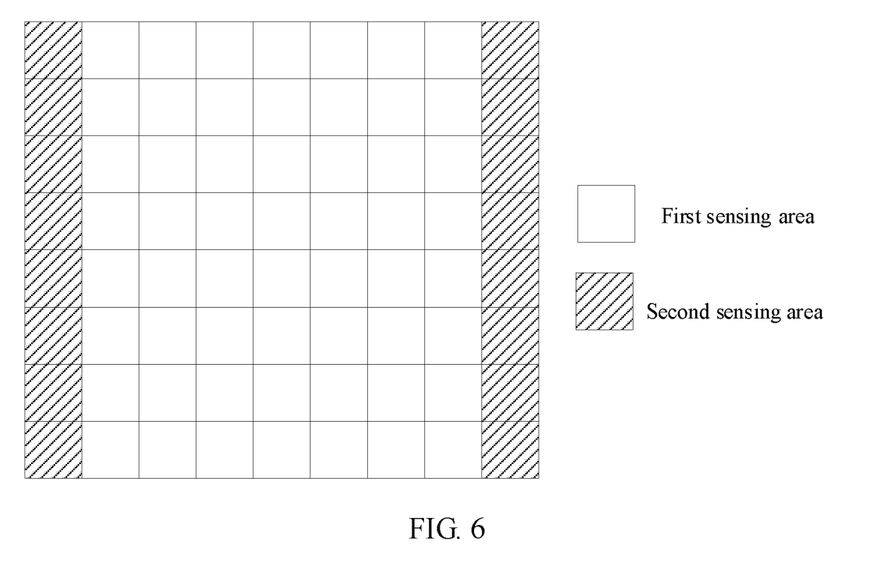
FIG. 6 presents a third schematic diagram of locations of a first sensing region and a second sensing region of a photosensitive fingerprint sensor in a photoelectric fingerprint identification apparatus according to an embodiment of the present disclosure.

For example, the outer side of the image capture pixel region includes:

a circumference of the image capture pixel region, as shown in FIG. 4;

one side of the image capture pixel region, as shown in FIG. 5; or a plurality of sides of the image capture pixel region, as shown in FIG. 6.

Optionally, as shown in FIG. 4, FIG. 5, and FIG. 6, the image capture pixel region occupies at least one column of pixels of the pixel array, and the virtual sensing pixel region occupies pixels in the pixel array other than the pixels occupied by the image capture pixel region.

In an optional embodiment, as shown in FIG. 2, the photoelectric fingerprint identification apparatus further includes:

an optical lens 8 disposed above the infrared filter 2.

In summary, an identification principle of the photoelectric fingerprint identification apparatus provided by this embodiment of the present disclosure is as follows:

After the first light signal emitted by the first light-emitting subunit is reflected by the finger above the detection surface, the first light signal returns to the first sensing region of the photoelectric fingerprint sensor through the optical lens, and the first sensing region of the photoelectric fingerprint sensor senses a reflected fingerprint ridge-valley energy difference, thereby forming an image with different grayscales, that is, forming an original fingerprint image, so that fingerprint information can be further obtained.

After the second light signal emitted by the second light-emitting subunit is reflected by a blood vessel of the finger above the detection surface, the second light signal returns to the second sensing region of the photoelectric fingerprint sensor, and the second sensing region of the photoelectric fingerprint sensor senses different infrared energy reflected by the blood vessel, thereby implementing human heart rate detection and obtaining a living body feature.

It should be noted that after the second light signal emitted by the second light-emitting subunit is reflected by the blood vessel of the finger above the detection surface, a part of reflected light may be reflected to a position above the first sensing region; because the first sensing region is covered with the infrared filter, the infrared filter filters out reflected red light or infrared; therefore, no interference is caused to fingerprint detection.

In summary, in this embodiment of the present disclosure, the first sensing region corresponding to fingerprint sensor is designed and attached with the infrared filter to filter out the red light and infrared that interfere with the fingerprint image capture, but the second sensing region is not covered with an infrared filter, so that an infrared spectrum can be prevented from being filtered out. During fingerprint identification or image capture, a non-interfered image of the first sensing region can be obtained by removing obtained image information of the second sensing region. This method is used to resolve a problem that there are contradictions between fingerprint capture and infrared-based living body detection in technical requirements of the infrared filter. Because the sensing region of the photoelectric fingerprint sensor is partitioned, the photoelectric fingerprint sensor can be directly used to detect a heart rate of a living body in addition to capturing a fingerprint image. Therefore, a photoelectric fingerprint anti-counterfeit capability and anti-counterfeit performance of photoelectric fingerprint identification are improved, design space is saved, and hardware anti-counterfeit design costs are reduced.

An embodiment of the present disclosure further provides a terminal, including the foregoing photoelectric fingerprint identification apparatus.

In an optional embodiment, the terminal includes an organic light-emitting diode OLED screen, where the OLED screen serves as a touch assembly of the photoelectric fingerprint identification apparatus; and a self-luminous unit of the OLED screen serves as a first light-emitting subunit of the photoelectric fingerprint identification apparatus.

In this embodiment of the present disclosure, a sensing region of a photoelectric fingerprint sensor of the terminal is partitioned into a first sensing region and a second sensing region that do not overlap each other, and the first sensing region corresponding to fingerprint capture is designed and attached with an infrared filter to filter out red light and infrared that interfere with a fingerprint image, but the second sensing region is not covered with an infrared filter, so that an infrared spectrum can be prevented from being filtered out. During fingerprint identification or capture, a non-interfered image of the first sensing region can be obtained by removing obtained image information of the second sensing region. This method is used to resolve a problem that there are contradictions between fingerprint capture and infrared-based living body detection in technical requirements of the infrared filter. Because the sensing region of the photoelectric fingerprint sensor is partitioned, the photoelectric fingerprint sensor can be directly used to detect a heart rate of a living body in addition to capturing a fingerprint image. Therefore, a photoelectric fingerprint anti-counterfeit capability and anti-counterfeit performance of photoelectric fingerprint identification are improved, design space is saved, and hardware anti-counterfeit design costs are reduced.

Figure 7:
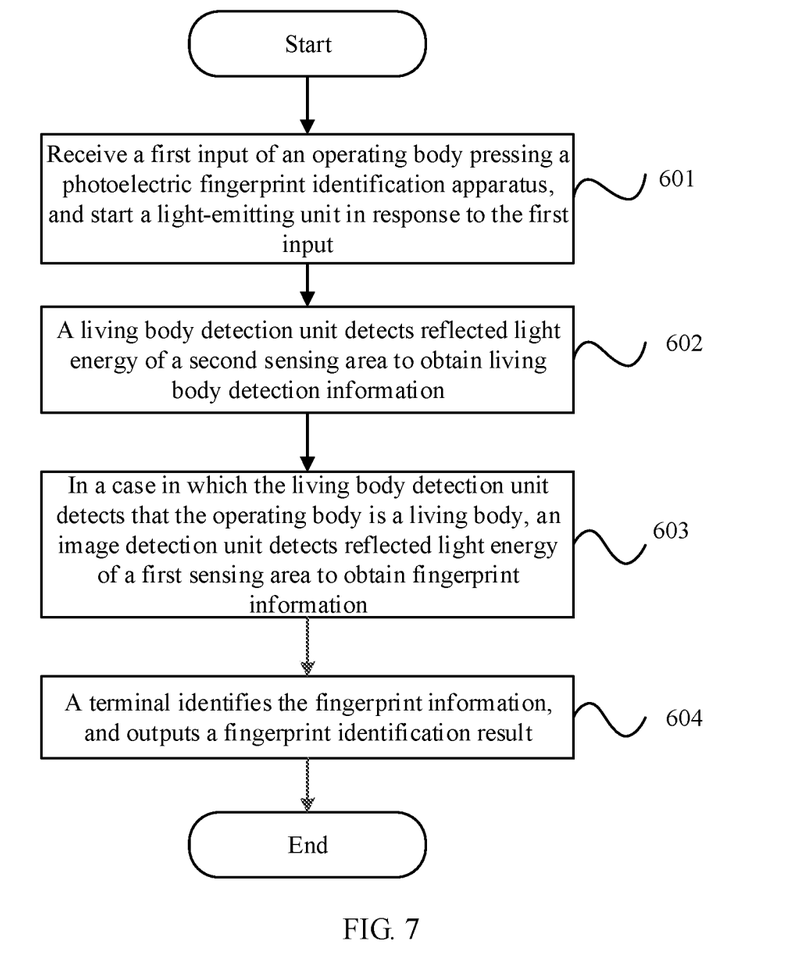
FIG. 7 presents a flowchart of steps of a fingerprint identification method according to an embodiment of the present disclosure.

As shown in FIG. 7, an embodiment of the present disclosure further provides a fingerprint identification method applied to the foregoing photoelectric fingerprint identification apparatus or applied to the foregoing terminal. In this embodiment of the present disclosure, the photoelectric fingerprint identification apparatus or the terminal includes a photoelectric fingerprint sensor, a light-emitting unit, an image detection unit, and a living body detection unit. The photoelectric fingerprint sensor includes a first sensing region and a second sensing region that do not overlap each other. The first sensing region is covered with an infrared filter. The infrared filter is mainly configured to filter out red light and infrared that interfere with fingerprint image capture.

The method includes the following steps.

Step 601: Receive a first input of an operating body pressing the photoelectric fingerprint identification apparatus, and start the light-emitting unit in response to the first input.

In this step, after the light-emitting unit is started, the light-emitting unit emits a first light signal and a second light signal, and the first light signal and the second light signal respectively reach the first sensing region and the second sensing region after being reflected by a finger. It should be noted that because the infrared filter is disposed, a reflected light of the second light signal cannot reach the first sensing region, and interference on the first sensing region is avoided.

Step 602: The living body detection unit detects reflected light energy of the second sensing region to obtain living body detection information.

In this step, after the second light signal emitted by the second light-emitting sub-unit is reflected by a blood vessel of the finger above a detection surface, the second light signal returns to the second sensing region of the photoelectric fingerprint sensor. In this way, human heart rate detection is implemented, and a living body feature is obtained.

Step 603: In a case in which the living body detection unit detects that the operating body is a living body, the image detection unit detects reflected light energy of the first sensing region to obtain fingerprint information.

In this step, after the first light signal emitted by the first light-emitting unit is reflected by the finger above the detection surface, the first light signal returns to the first sensing region of the photoelectric fingerprint sensor through an optical lens, and the first sensing region of the photoelectric fingerprint sensor senses a difference of light source energy reflected by ridges and valleys of a fingerprint, thereby forming an image with different grayscales, that is, forming an original fingerprint image.

Step 604: The terminal identifies the fingerprint information, and outputs a fingerprint identification result.

The light-emitting unit generates at least the first light signal and the second light signal, the first light signal includes visible light that has a shorter wavelength than red light, and the second light signal includes red light or infrared; and reflected light of the first light signal generated by the light-emitting unit is able to reach the first sensing region of the photoelectric fingerprint sensor, and reflected light of the second light signal generated by the light-emitting unit is able to reach the second sensing region of the photoelectric fingerprint sensor.

In summary, in this embodiment of the present disclosure, the first sensing region corresponding to fingerprint capture is designed and attached with the infrared filter to filter out red light and infrared that interfere with a fingerprint image, but the second sensing region is not covered with an infrared filter, so that an infrared spectrum can be prevented from being filtered out. During fingerprint identification or capture, a non-interfered image of the first sensing region can be obtained by removing obtained image information of the second sensing region. This method is used to resolve a problem that there are contradictions between fingerprint capture and infrared-based living body detection in technical requirements of the infrared filter. Because the sensing region of the photoelectric fingerprint sensor is partitioned, the photoelectric fingerprint sensor can be directly used to detect a heart rate of a living body in addition to capturing a fingerprint image. Therefore, a photoelectric fingerprint anti-counterfeit capability and anti-counterfeit performance of photoelectric fingerprint identification are improved, design space is saved, and hardware anti-counterfeit design costs are reduced.

Figure 8:
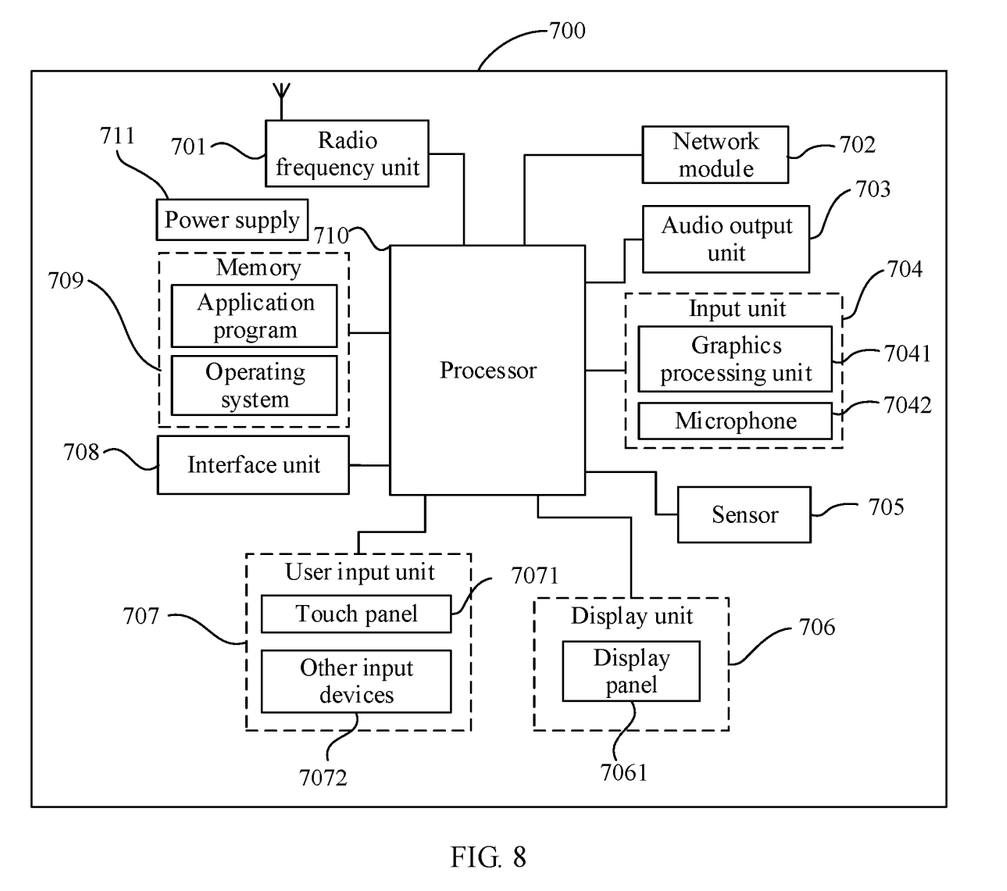
FIG. 8 presents a schematic structural diagram of a terminal according to an embodiment of the present disclosure.

FIG. 8 is a schematic diagram of a hardware structure of a terminal for implementing the embodiments of the present disclosure. The terminal 700 includes but is not limited to components such as a radio frequency unit 701, a network module 702, an audio output unit 703, an input unit 704, a sensor 705, a display unit 706, a user input unit 707, an interface unit 708, a memory 709, a processor 710, and a power supply 711. A person skilled in the art may understand that the structure of the terminal shown in FIG. 8 does not constitute a limitation on the terminal. The terminal may include more or fewer components than shown in the figure, or combine some of the components or have different arrangements of the components. In this embodiment of the present disclosure, the terminal includes but is not limited to a mobile phone, a tablet computer, a notebook computer, a palmtop computer, an in-vehicle terminal, a wearable device, a pedometer, or the like.

The radio frequency unit 701 is configured to receive a first input of an operating body pressing a photoelectric fingerprint identification apparatus, and start a light-emitting unit in response to the first input.

The processor 710 is configured to detect, reflected light energy of the second sensing region to obtain living body detection information through a living body detection unit; in a case in which the living body detection unit detects that the operating body is a living body, detect, reflected light energy of the first sensing region to obtain fingerprint information through an image detection unit; and identify the fingerprint information, and output a fingerprint identification result.

The light-emitting unit generates at least a first light signal and a second light signal, the first light signal includes visible light that has a shorter wavelength than red light, and the second light signal includes red light or infrared; and reflected light of the first light signal generated by the light-emitting unit is able to reach the first sensing region of the photoelectric fingerprint sensor, and reflected light of the second light signal generated by the light-emitting unit is able to reach the second sensing region of the photoelectric fingerprint sensor.

In this embodiment of the present disclosure, the first sensing region corresponding to fingerprint capture is designed and attached with an infrared filter to filter out red light and infrared that interfere with an fingerprint image, but the second sensing region is not covered with an infrared filter, so that an infrared spectrum can be prevented from being filtered out. During fingerprint identification or capture, a non-interfered image of the first sensing region can be obtained by removing obtained image information of the second sensing region. This method is used to resolve a problem that there are contradictions between fingerprint capture and infrared-based living body detection in technical requirements of the infrared filter. Because the sensing region of the photoelectric fingerprint sensor is partitioned, the photoelectric fingerprint sensor can be directly used to detect a heart rate of a living body in addition to capturing a fingerprint image. Therefore, a photoelectric fingerprint anti-counterfeit capability and anti-counterfeit performance of photoelectric fingerprint identification are improved, design space is saved, and hardware anti-counterfeit design costs are reduced.

It should be understood that in this embodiment of the present disclosure, the radio frequency unit 701 may be configured to: receive and transmit signals in an information receiving/transmitting process or a call process; and specifically, after receiving downlink data from a base station, transmit the downlink data to the processor 710 for processing, and in addition, transmit uplink data to the base station. Generally, the radio frequency unit 701 includes but is not limited to an antenna, at least one amplifier, a transceiver, a coupler, a low noise amplifier, a duplexer, and the like. In addition, the radio frequency unit 701 may further communicate with a network and another device through a wireless communications system.

The terminal provides wireless broadband Internet access for a user by using the network module 702, for example, helping the user to transmit and receive e-mails, browse web pages, and access streaming media.

The audio output unit 703 may convert audio data received by the radio frequency unit 701 or the network module 702 or stored in the memory 709 into an audio signal, and output the audio signal as a sound. In addition, the audio output unit 703 may further provide an audio output (for example, a call signal received sound or a message received sound) related to a specific function performed by the terminal 700. The audio output unit 703 includes a speaker, a buzzer, a telephone receiver, and the like.

The input unit 704 is configured to receive an audio or video signal. The input unit 704 may include a graphics processing unit (GPU) 7041 and a microphone 7042. The graphics processing unit 7041 processes image data of a still picture or a video obtained by an image capture apparatus (for example, a camera) in an image capture mode or a video capture mode. A processed image frame may be displayed on the display unit 706. An image frame processed by the graphics processing unit 7041 may be stored in the memory 709 (or another storage medium) or sent by the radio frequency unit 701 or the network module 702. The microphone 7042 can receive a sound and can process the sound into audio data. The processed audio data can be converted in a telephone call mode into a format that can be sent to a mobile communications base station through the radio frequency unit 701, for outputting.

The terminal 700 further includes at least one sensor 705, for example, an optical sensor, a motion sensor, and another sensor. Specifically, the optical sensor includes an ambient light sensor and a proximity sensor. The ambient light sensor may adjust luminance of a display panel 7061 based on brightness of ambient light. The proximity sensor may turn off the display panel 7061 and/or backlight when the terminal 700 moves to an ear. As a type of motion sensor, an accelerometer sensor can detect magnitudes of accelerations in all directions (usually three axes), can detect a magnitude and a direction of gravity when the terminal is in a stationary state, and can be applied to terminal posture recognition (such as screen switching between portrait and landscape, related games, and magnetometer posture calibration), functions related to vibration recognition (such as pedometer and tapping), and the like. The sensor 705 may further include a fingerprint sensor, a pressure sensor, an iris sensor, a molecular sensor, a gyroscope, a barometer, a hygrometer, a thermometer, an infrared sensor, and the like. Details are not described herein.

The display unit 706 is configured to display information input by the user or information provided for the user. The display unit 706 may include the display panel 7061. The display panel 7061 may be configured in a form of a liquid crystal display (LCD), an organic light-emitting diode (OLED), or the like.

The user input unit 707 may be configured to receive input digit or character information, and generate a key signal input related to a user setting and function control of the terminal. Specifically, the user input unit 707 includes a touch panel 7071 and other input devices 7072. The touch panel 7071, also referred to as a touchscreen, may capture a touch operation performed by the user on or near the touch panel (for example, an operation performed by the user on the touch panel 7071 or near the touch panel 7071 by using any appropriate object or accessory such as a finger or a stylus). The touch panel 7071 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information into point coordinates, sends the point coordinates to the processor 710, and receives and executes a command sent by the processor 710. In addition, the touch panel 7071 may be implemented in a plurality of forms, for example, a resistive, capacitive, infrared, or surface acoustic wave touch panel. The user input unit 707 may further include the other input devices 7072 in addition to the touch panel 7071. Specifically, the other input devices 7072 may include but are not limited to a physical keyboard, a function key (such as a volume control key or a power on/off key), a trackball, a mouse, a joystick, and the like. Details are not described herein.

Further, the touch panel 7071 may cover the display panel 7061. After the touch panel 7071 detects a touch operation on or near the touch panel, the touch panel 7071 transmits the touch operation to the processor 710 to determine a type of a touch event. Then the processor 710 provides a corresponding visual output on the display panel 7061 based on the type of the touch event. Although the touch panel 7071 and the display panel 7061 are used as two independent components to implement input and output functions of the terminal in FIG. 8, the touch panel 7071 and the display panel 7061 may be integrated to implement the input and output functions of the terminal in some embodiments. This is not specifically limited herein.

The interface unit 708 is an interface for connecting an external apparatus to the terminal 700. For example, the external apparatus may include a wired or wireless headphone port, an external power (or battery charger) port, a wired or wireless data port, a memory card port, a port for connecting an apparatus having an identification module, an audio input/output (input/output, I/O) port, a video I/O port, an earphone port, and the like. The interface unit 708 may be configured to receive an input (for example, data information or power) from an external apparatus, and transmit the received input to one or more components in the terminal 700, or may be configured to transmit data between the terminal 700 and an external apparatus.

The memory 709 may be configured to store a software program and various data. The memory 709 may mainly include a program storage region and a data storage region. The program storage region may store an operating system, an application program required for at least one function (such as a sound play function and an image play function), and the like. The data storage region may store data created based on use of the terminal (such as audio data and a phone book), and the like. In addition, the memory 709 may include a high-speed random access memory, or may include a non-volatile memory, for example, at least one magnetic disk storage device, a flash memory, or other non-volatile solid-state storage devices.

The processor 710 is a control center of the terminal. The processor 710 uses various interfaces and lines to connect all parts of the entire terminal, and performs various functions and data processing of the terminal by running or executing the software program and/or module stored in the memory 709 and invoking data stored in the memory 709, thereby performing overall monitoring on the terminal. The processor 710 may include one or more processing units. Optionally, the processor 710 may integrate an application processor and a modem processor. The application processor mainly processes the operating system, a user interface, an application program, and the like. The modem processor mainly processes wireless communication. It may be understood that the modem processor may alternatively not be integrated into the processor 710.

The terminal 700 may further include the power supply 711 (for example, a battery) supplying power to all components. Optionally, the power supply 711 may be logically connected to the processor 710 through a power management system. In this way, functions such as charge management, discharge management, and power consumption management are implemented by using the power management system.

In addition, the terminal 700 includes some functional modules that are not illustrated. Details are not described herein.

Optionally, an embodiment of the present disclosure further provides a terminal, including a processor, a memory, and a computer program stored in the memory and capable of running on the processor. When the computer program is executed by the processor, each process of the foregoing embodiment of the fingerprint identification method is implemented, with a same technical effect achieved. To avoid repetition, details are not described again herein.

An embodiment of the present disclosure further provides a computer-readable storage medium, where a computer program is stored in the computer-readable storage medium. When the computer program is executed by a processor, each process of the foregoing embodiment of the fingerprint identification method is implemented, with the same technical effect achieved. To avoid repetition, details are not described again herein. The computer-readable storage medium is, for example, a read-only memory (ROM), a random access memory (RAM), a magnetic disk, or an optical disc.

It should be noted that in this specification, the term "comprise", "include", or any other variant thereof is intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element.

According to the description of the foregoing embodiments, a person skilled in the art may clearly understand that the method in the foregoing embodiments may be implemented by software in addition to a necessary universal hardware platform or by hardware only. In most cases, the former is a more preferred implementation. Based on such an understanding, the technical solutions of the present disclosure essentially, or the part contributing to the related art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of the present disclosure.

A person of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described again herein.

In the embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communications connections may be implemented by using some interfaces. The indirect couplings or communications connections between the apparatuses or units may be implemented in electronic, mechanical, or other forms.

The units described as separate parts may or may not be physically separate, and parts displayed as units may or may not be physical units, may be located in one position, or may be distributed on a plurality of network elements. Some or all of the units may be selected based on actual requirements to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present disclosure essentially, or the part contributing to the related art may be embodied in a form of a computer software product. The computer software product is stored in a storage medium, and includes several instructions for instructing a computer device (which may be a personal computer, a server, a network device, or the like) to perform all or some of the steps of the methods described in the embodiments of the present disclosure. The foregoing storage medium includes: any medium that can store program code, such as a USB flash drive, a removable hard disk, a ROM, a RAM, a magnetic disk, or an optical disc.

A person of ordinary skill in the art may understand that all or some of the processes of the methods in the embodiments may be implemented by a computer program controlling relevant hardware. The program may be stored in a computer-readable storage medium. When the program runs, the processes of the methods in the embodiments are performed. The storage medium may be: a magnetic disk, an optical disc, a read-only memory (ROM), a random access memory (RAM), or the like.

It may be understood that the embodiments described in the embodiments of the present disclosure may be implemented by hardware, software, firmware, middleware, microcode, or a combination thereof. For hardware implementation, the module, unit, or subunit may be implemented in one or more application specific integrated circuits (ASIC), digital signal processors (DSP), digital signal processing devices (DSPD), programmable logic devices (PLD), field-programmable gate arrays (FPGA), general purpose processors, controllers, microcontrollers, microprocessors, and other electronic units for performing the functions described in the present disclosure, or a combination thereof.

For software implementation, the technologies described in the embodiments of the present disclosure may be implemented by modules (for example, processes or functions) that perform the functions described in the embodiments of the present disclosure. Software code may be stored in the memory and executed by the processor. The memory may be implemented in or outside the processor.

The embodiments of the present disclosure are described above with reference to the accompanying drawings, but the present disclosure is not limited to the embodiments. The embodiments are only illustrative rather than restrictive. Inspired by the present disclosure, a person of ordinary skill in the art can still derive a plurality of variations without departing from the essence of the present disclosure and the protection scope of the claims. All these variations shall fall within the protection scope of the present disclosure.

The foregoing descriptions are only specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A photoelectric fingerprint identification apparatus, comprising:
   a light-emitting unit, wherein the light-emitting unit generates at least a first light signal and a second light signal, the first light signal comprises visible light that has a shorter wavelength than red light, and the second light signal comprises red light or infrared;
   a photoelectric fingerprint sensor, wherein the photoelectric fingerprint sensor comprises a first sensing region and a second sensing region that do not overlap each other, and the first sensing region is covered with an infrared filter; wherein
   reflected light of the first light signal generated by the light-emitting unit is able to reach the first sensing region, and reflected light of the second light signal generated by the light-emitting unit is able to reach the second sensing region;
   a living body detection unit, wherein the living body detection unit is connected to the photoelectric fingerprint sensor, and the living body detection unit is configured to detect reflected light energy of the second sensing region to obtain living body detection information; and
   an image detection unit, wherein the image detection unit is connected to the photoelectric fingerprint sensor, and the image detection unit is configured to detect reflected light energy of the first sensing region to obtain fingerprint information in a case in which the living body detection unit detects that the operating body is a living body.

2. The photoelectric fingerprint identification apparatus according to claim 1, further comprising a touch assembly, wherein the touch assembly is provided with a detection surface capable of transmitting light signals; and the light-emitting unit emits the first light signal and the second light signal toward the detection surface, the first light signal reaches the first sensing region after being reflected by an obstruction on the detection surface, and the second light signal reaches the second sensing region after being reflected by the obstruction on the detection surface.

3. The photoelectric fingerprint identification apparatus according to claim 2, further comprising a printed circuit board, wherein
the photoelectric fingerprint sensor is disposed on the printed circuit board.

4. The photoelectric fingerprint identification apparatus according to claim 3, wherein the light-emitting unit comprises:
a first light-emitting subunit, configured to generate the first light signal; and
a second light-emitting subunit, configured to generate the second light signal; wherein
the first light-emitting subunit and the second light-emitting subunit are both disposed on the printed circuit board; or the first light-emitting subunit is disposed in the touch assembly, and the second light-emitting subunit is disposed on the printed circuit board.

5. The photoelectric fingerprint identification apparatus according to claim 1, wherein the sensing region of the photoelectric fingerprint sensor comprises a pixel array; and
the first sensing region is an image capture pixel region for capturing a fingerprint image, and the second sensing region is a virtual sensing pixel region for infrared sensing.

6. The photoelectric fingerprint identification apparatus according to claim 5, wherein the virtual sensing pixel region is distributed on an outer side of the image capture pixel region; or
the virtual sensing pixel region is distributed on an inner side of the image capture pixel region.

7. The photoelectric fingerprint identification apparatus according to claim 6, wherein the outer side of the image capture pixel region comprises a circumference of the image capture pixel region, one side of the image capture pixel region, or a plurality of sides of the image capture pixel region.

8. The photoelectric fingerprint identification apparatus according to claim 5, wherein the image capture pixel region occupies at least one column of pixels of the pixel array, and the virtual sensing pixel region occupies pixels in the pixel array other than the pixels occupied by the image capture pixel region.

9. The photoelectric fingerprint identification apparatus according to claim 1, further comprising:
an optical lens disposed above the infrared filter.

10. A terminal, comprising a photoelectric fingerprint identification apparatus, wherein the photoelectric fingerprint identification apparatus comprises:
a light-emitting unit, wherein the light-emitting unit generates at least a first light signal and a second light signal, the first light signal comprises visible light that has a shorter wavelength than red light, and the second light signal comprises red light or infrared;
a photoelectric fingerprint sensor, wherein the photoelectric fingerprint sensor comprises a first sensing region and a second sensing region that do not overlap each other, and the first sensing region is covered with an infrared filter; wherein
reflected light of the first light signal generated by the light-emitting unit is able to reach the first sensing region, and reflected light of the second light signal generated by the light-emitting unit is able to reach the second sensing region;
a living body detection unit, wherein the living body detection unit is connected to the photoelectric fingerprint sensor, and the living body detection unit is configured to detect reflected light energy of the second sensing region to obtain living body detection information; and
an image detection unit, wherein the image detection unit is connected to the photoelectric fingerprint sensor, and the image detection unit is configured to detect reflected light energy of the first sensing region to obtain fingerprint information in a case in which the living body detection unit detects that the operating body is a living body.

11. The terminal according to claim 10, comprising an organic light-emitting diode (OLED) screen, wherein the OLED screen serves as a touch assembly of the photoelectric fingerprint identification apparatus; and
a self-luminous unit of the OLED screen serves as a first light-emitting subunit of the photoelectric fingerprint identification apparatus.

12. A fingerprint identification method applied to the terminal according to claim 10, and comprising:
receiving a first input of an operating body pressing the photoelectric fingerprint identification apparatus, and starting the light-emitting unit in response to the first input;
detecting, by the living body detection unit, reflected light energy of the second sensing region to obtain living body detection information;
in a case in which the living body detection unit detects that the operating body is a living body, detecting, by the image detection unit, reflected light energy of the first sensing region to obtain fingerprint information; and
identifying, by the terminal, the fingerprint information, and outputting a fingerprint identification result; wherein
the light-emitting unit generates at least a first light signal and a second light signal, the first light signal comprises visible light that has a shorter wavelength than red light, and the second light signal comprises red light or infrared; and reflected light of the first light signal generated by the light-emitting unit is able to reach the first sensing region of the photoelectric fingerprint sensor, and reflected light of the second light signal generated by the light-emitting unit is able to reach the second sensing region of the photoelectric fingerprint sensor.

13. A terminal, comprising a processor, a memory, and a computer program stored in the memory and capable of running on the processor, wherein when the computer program is executed by the processor, the steps of the fingerprint identification method according to claim 12 are implemented.

14. A computer-readable storage medium, wherein the computer-readable storage medium stores a computer program, and when the computer program is executed by the processor, the steps of the fingerprint identification method according to claim 12 are implemented.

15. The terminal according to claim 10, further comprising a touch assembly, wherein the touch assembly is provided with a detection surface capable of transmitting light signals; and the light-emitting unit emits the first light signal and the second light signal toward the detection surface, the first light signal reaches the first sensing region after being reflected by an obstruction on the detection surface, and the second light signal reaches the second sensing region after being reflected by the obstruction on the detection surface.

16. The terminal according to claim 15, further comprising a printed circuit board, wherein
the photoelectric fingerprint sensor is disposed on the printed circuit board.

17. The terminal according to claim 16, wherein the light-emitting unit comprises:
a first light-emitting subunit, configured to generate the first light signal; and
a second light-emitting subunit, configured to generate the second light signal; wherein
the first light-emitting subunit and the second light-emitting subunit are both disposed on the printed circuit board; or the first light-emitting subunit is disposed in the touch assembly, and the second light-emitting subunit is disposed on the printed circuit board.

18. The terminal according to claim 10, wherein the sensing region of the photoelectric fingerprint sensor comprises a pixel array; and
the first sensing region is an image capture pixel region for capturing a fingerprint image, and the second sensing region is a virtual sensing pixel region for infrared sensing.

19. The terminal according to claim 18, wherein the virtual sensing pixel region is distributed on an outer side of the image capture pixel region; or
the virtual sensing pixel region is distributed on an inner side of the image capture pixel region.

20. The terminal according to claim 19, wherein the outer side of the image capture pixel region comprises a circumference of the image capture pixel region, one side of the image capture pixel region, or a plurality of sides of the image capture pixel region.

* * * * *